United States Patent [19]

Kaymaram

[11] Patent Number: 4,875,118
[45] Date of Patent: Oct. 17, 1989

[54] REDUCING HARMFUL RUNOUT IN A RIGID MAGNETIC DISK THROUGH USE OF SHIMS

[75] Inventor: Farid Kaymaram, Cambridge, Mass.

[73] Assignee: Magnetic Peripherals Inc., Minneapolis, Minn.

[21] Appl. No.: 176,968

[22] Filed: Apr. 4, 1988

[51] Int. Cl.$^4$ .............................................. G11B 17/02
[52] U.S. Cl. .................................. 360/99.12; 369/271
[58] Field of Search .................. 360/137, 97.01, 99.12, 360/99.05, 99.08; 369/271

[56] References Cited

U.S. PATENT DOCUMENTS 4,561,035 12/1985 McDorman et al. ......... 360/99.12 X
4,755,981 7/1988 Ekhoff .......................... 360/99.12 X Primary Examiner—Robert S. Tupper
Assistant Examiner—Andrew L. Sniezek
Attorney, Agent, or Firm—Joseph A. Genovese; Robert M. Angus

[57] ABSTRACT

Runout in a rigid magnetic disk is reduced by sandwiching a sized shim between the disk and disk support to form a substantially smooth sinusoidal circumferential profile to the disk. A method of determining shim size is also described, employing test disks for determining optimal shim size for each class of rigid disk.

2 Claims, 4 Drawing Sheets

— 6.75 mil

— 5.0 mil

— 3.0 mil

— 2.5 mil

— 1.3 mil

— 0.61 mil

— 0.49 mil

— 0.38 mil

REDUCING HARMFUL RUNOUT IN A RIGID MAGNETIC DISK THROUGH USE OF SHIMS

This invention relates to magnetic recording, and particularly to digital magnetic recording on rotatable disks.

Runout is defined as the lack of flatness in a disk. Runout is the vertical displacement of the surface of the disk, or more particularly, the vertical displacement which the head must follow in tracking over the revolving disk. Runout is caused by a number of factors, including unbalanced forces acting on the disk drive spindle, vibration, external noise, disk warpage, lack of perpendicularity of the spindle, and lateral motion of the spindle caused by ballbearing imperfections. Severe cases of runout result in injury to the overcoat on the disk, which in turn cause increased head crashes and the like.

The present invention is concerned with rigid disks, as opposed to flexible or floppy disks. A rigid disk is characterized as employing a substrate of such thickness and material (such as aluminum, aluminum-magnesium or ceramic) as to retain rigidity. The rigid disk is sufficiently rigid of itself as to provide a stable plane for head tracking, without additional support. Conversely, a floppy disk, which is typically constructed of Mylar, is designed to be freeely bendable under its own weight (a rigid disk will not bend under its own weight) and is designed to conform its profile to the head tracking over the disk. Typically a floppy disk requires a fixed pad or head or other support to provide a stable plane to permit head tracking. As used herein, rigid disk includes both thin film rigid disks and thick film rigid disks, the two differing primarily in the thickness and manner of application of the magnetic layer.

Heretofore, in the case of rigid disks, including thin film rigid disks, researchers have sought to cure the problems of high wear rate, friction, and corrosion resistance by applying resistant overcoats to the magnetic media to increase the wear characteristics of the disk surface. Lubricants have also been applied to disks to minimize undesirable effects during the landing and takeoff of the head from the disk surface. However, researchers have not met with much success in overcoming the effects of runout, as most effort has been directed at improving disk manufacturing techniques to achieve rigid disks that are as flat as possible. However, after a few thousand landing and take off cycles, friction between the disk and the head increases dramatically, affecting wear of the disk and head. Environmental factors, particularly humidity, affect the properties of the overcoat, increasing striction and altering the wear characteristics of the head/disk interface. Also, scratches on the disk and/or head, including the rails, affect the flying characteristics of the head. Dust and other airborne particles within the disk chamber also affect the flying characteristics of the head. All of these factor contribute to altering the physical topography of the disk and deleteriously affecting the flying characteristics of the head and the read/write performance of the drive.

I have discovered that rigid disks exhibit some runout, especially during in-site use. Employing a capacitance probe, I have determined the displacement of runout in a number of rigid disks, particularly thin film rigid disks, and have found the runout to usually be less than about one mil. I have found that the mean time to failure of a disk is maximized by minimizing the displacement of the runout. However, for runouts less than about 1 mil, I have found that the profile of the runout is highly complex, requiring the head to follow rapid fluctuations in the vertical movement of the disk. Conversely, I've also found that where the runout exceeds about 1 mil, the runout profile is a reasonably smooth sinusoidal shape over the circumference of the disk, leading to greater life of the disk and a longer mean time to failure.

The present invention, therefore, concerns maintaining a reasonably smooth sinusoidal profile to the rigid disk circumference having an amplitude (runout) as small as practical.

To achieve a reasonably sinusoidal profile to the circumferential profile of the disk, I place a sized shim between the disk and the disk support at the spindle of the drive. The shim deforms the disk at a single point on its circumference to form a reasonably sinusoidal circumferential profile. By sizing the thickness of the shim to optimum, usually more than 1 mil, the life of the disk may be dramatically increased.

It is, therefore, an object of the present invention to provide apparatus to dramatically increase the life of a rigid disk in a magnetic disk drive through the employment of a sized shim to create a reasonably sinusoidal circumferential profile in the disk surface.

Another object of the present invention is to provide a technique for determining the correct size of the shim required for optimum runout displacement to achieve a maximum useful life of a rigid magnetic disk.

In accordance with the present invention, a sized shim is placed on the disk support adjacent the spindle at one location of the circumference of the disk. The thickness of the shim is determined by examining the mean time to failure profile in relation to controlled runout displacement of several disks of the same class as under investigation. The resultant failure profile is employed to determine the correct thickness of the shim required for controlled runout displacement in other disks of the same class.

The above and other features of this invention will be more fully understood from the following detailed description, and the accompanying drawings, in which.

Figure 1:
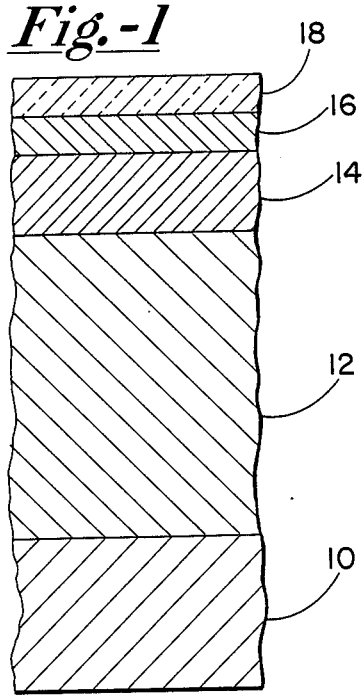
FIG. 1 is a section view of a typical thin film rigid disk used in a disk drive.

As shown in FIG. 1, a typical thin film rigid disk includes a substrate 10, an undercoat 12, a continuous film of metallic magnetic material 14, an overcoat 16 and a lubricant 18. By way of example, substrate 10 may be constructed of an aluminum-magnesium alloy with a thickness of the order of 0.075 inch, undercoat 12 may be a cobalt-nickel or cobalt-nickel-phosphate alloy having a thickness of about 2 microinches, and thin film 14 may be cobalt-chromium alloy having a thickness of the order of 2 to 4 microinches. Overcoat 16 may be constructed of silicon dioxide, rhodium, a plasma-polymerized fluorocarbon, or other hard carbon or graphite, is typically of the order of about 1 microinches. Lubricant 18 is typically a fluorocarbon or other suitable lubricant and is typically about 1 microinch in thickness. In the case of a thick film rigid disk, the construction is quite similar, except the thickness of the metallic magnetic layer 14 is of the order of about 30 microinches.

Figure 2:
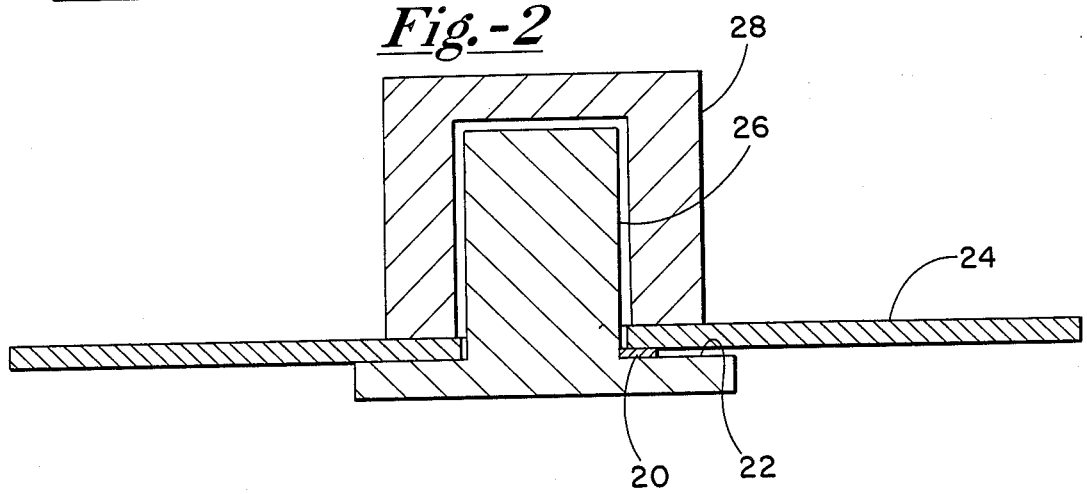
FIG. 2 is a section view of a disk support and spindle of a disk drive with a rigid disk illustrating the placement of a sized shim in accordance with the presently preferred embodiment of the present invention.
Figure 3:
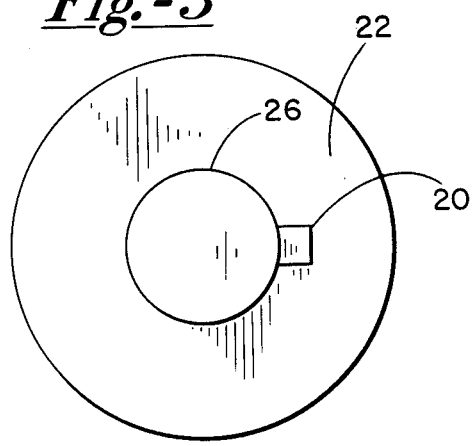
FIG. 3 is a top view of the disk support and spindle with the shim in place.

As illustrated in FIGS. 2 and 3, the present invention contemplates a shim 20 sandwiched between the disk support 22 and the disk 24 at a single location about the circumference of spindle 26. Clamp 28 rigidly clamps disk 24 against disk support surface 22 and shim 20 to create a reasonably sinusoidal circumferential profile to disk 24.

Figure 4A:
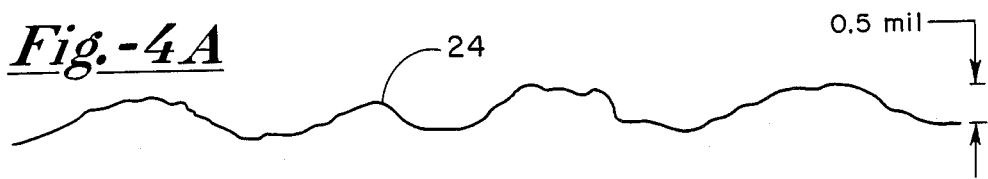
FIGS. 4A and 4B illustrate typical profiles of the circumference of rigid disks, both with and without the shim of the present invention.

As illustrated in FIG. 4A, the typical disk profile about the circumference of a disk 24 may exhibit runout which varies as much as about 0.5 mil (typically). The runout usually follows an erratic, irregular pattern as shown in FIG. 4A. Sandwiching a sized shim 20 at a single location at the circumference of the disk tends to smooth the circumferential shape of the disk surface to a reasonably sinusoidal shape, having its peak adjacent the shim, and its lowest point approximately 180° therefrom.

The size of the shim 20 depends, in part, upon the characteristics of the rigid disk.

Figure 5:
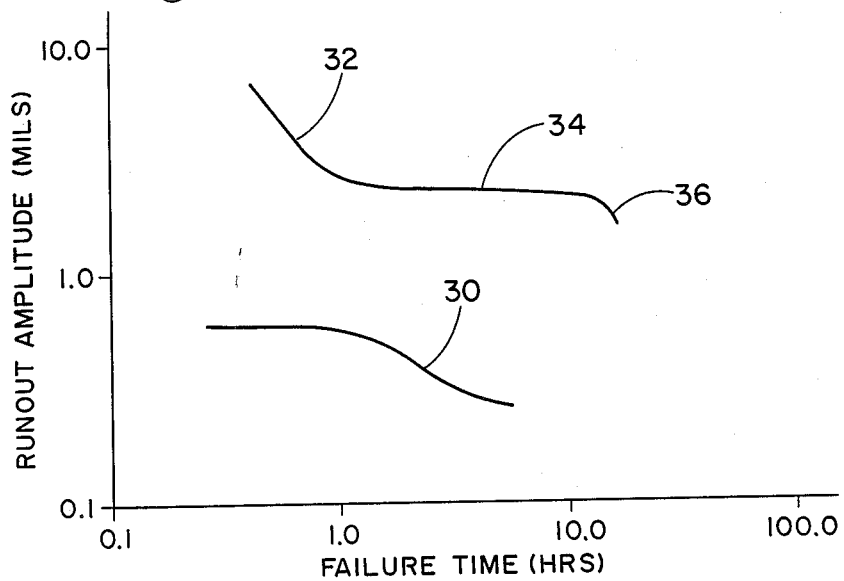
FIG. 5 is a graph illustrating the runout amplitude or displacement plotted against mean time to failure, useful for determining the correct size of a shim for use in accordance with this invention.

FIG. 5 is a graph in log-log scale illustrating the profile of the runout displacement versus mean time to failure for 5¼ inch diameter thin film rigid test disks having a carbon overcoat all of the same type and class, and a calcium titanate slider bearing against the disk at 15 grams. A capacitance probe was used to measure runout (vertical) displacement. The disks were operated under these conditions at 300 rpm until a wear track was visual (disk failure assumed). Several disks displayed natural runout displacement between about 0.25 mils and 0.61 mils (see FIGS. 6F-6H). The time to failure was plotted against the runout displacement for both sized shimmed runout and natural runout on a log-log scale. For purposes of this test, failure occurred when wear tracks were observed on the disk and a sudden increase occurred in the root mean square value of the acoustic emission signal and fluctuations occurred in friction. The results are illustrated in FIG. 5. The lower curve 30 in FIG. 5 illustrates the results of the failure tests for unshimmed disks. I found that the unshimmed disks with the smallest runout had the greatest mean time to failure, approaching 5½ to 6 hours for disks with runout in the vicinity of 0.25 mils. In practice, instead of observing the test disks for wear tracks as stated, determining predetermined levels of read/write error rates or recovered signal degradation may be a more reliable failure determination.

The upper curve 32 in FIG. 5 illustrates the runout displacement versus mean time to failure for disks which have been shimmed as illustrated in FIGS. 2 and 3. The thickness of the shims varied between 1.3 mils and 6.75 mils for different tests. As shown, a flat region 34 occurs in curve 32, at about 1.5 to 2.0 mil thickness (for the class of disk under test). As will be seen, the low end of the flat region at the region 36 represents the optimal shim thickness for the disk under consideration, and that thin film magnetic disks of the same type and class tested should be shimmed with a 1.5 mil shim in accordance with the present invention.

Figure 6A:
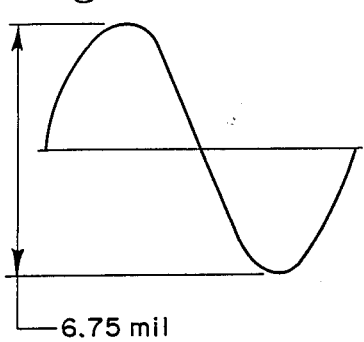
FIGS. 6A through 6H illustrate various profiles of the circumference of a disk with controlled and uncontrolled runout of specified displacement.
Figure 6B:
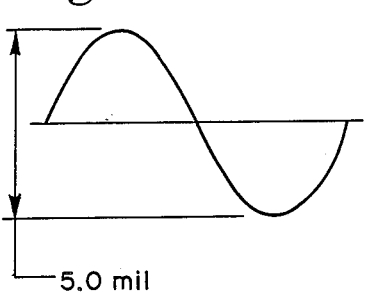
Figure 6C:
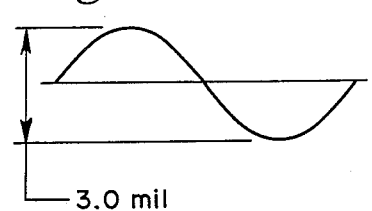
Figure 6D:
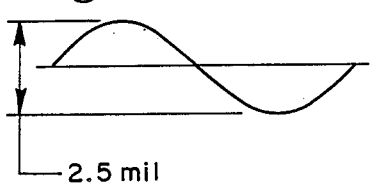
Figure 6E:
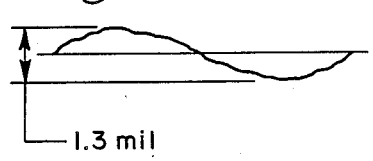
Figure 6F:
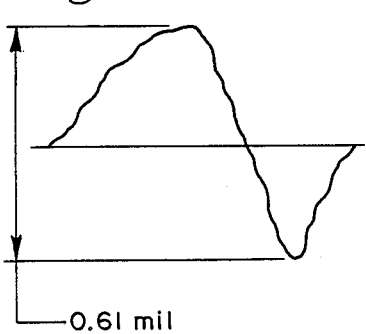
Figure 6G:
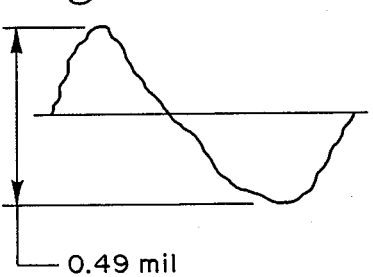
Figure 6H:
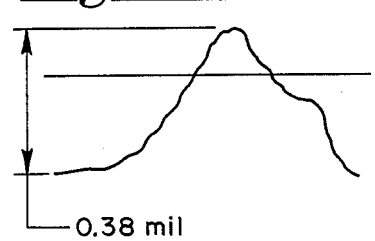

FIGS. 6A through 6H illustrate the runout profile for several of the disks employed in the test, including five disks which were shimmed and three which were not. Thus, FIGS. 6A through 6E illustrate the profiles of disks shimmed with 6.75, 5.0, 3.0, 2.5, and 1.3 mil shims, and FIGS. 6F through 6H illustrate the profiles of disks displaying natural runouts of 0.61, 0.49 and 0.38 mils. Inspection of the various profiles illustrated in FIGS. 6A through 6H reveals that the unshimmed or natural runout displacement is erratic and not smooth, whereas the shimmed profiles demonstrate relatively smooth sinusoidal shapes about the circumference of the disk. In the case of FIG. 6E, where the shim was only 1.3 mils, a small amount of erraticness to the profile is displayed.

No data is shown in FIG. 5 for runout displacement between about 1.0 mil and 0.61 mil. The reason is that at about 1.0 mil a transition occurs between curve 30 and 32 resulting in a runout producing unreliable life expectancy varying between very high (in excess of 150 hours in the example) and very low (less than 6 minutes in the example).

Figure 7:
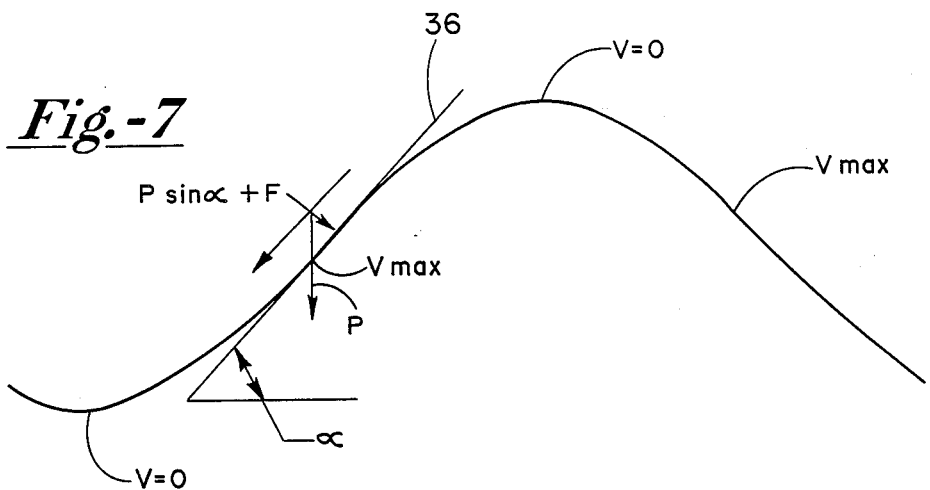
FIG. 7 is a diagram illustrating the principles of the present invention in determining optimum runout displacement.

FIG. 7 is a diagram of an ideal sinusoidal circumferential profile and is useful in explaining the theory of the present invention. At the absolute peaks of the sinusoidal profile of the disk, the velocity, in the vertical direction, of the flying head is zero, that is, it is not rising nor lowering. Midway between those two peaks, the slope of the curve is at a maximum and the vertical velocity is in its maximum state of rise or lowering. The actual velocity is illustrated by tangent 36. At the point of maximum slope, the spring constant P of the magnetic head toward the disk may be represented by two components, one parallel to the tangent line 36 and one normal to it. The effects of the spring constant which is normal to the disk is, of course, supported by the disk itself. However, the effects of the spring constant tangential to the disk at the point of peak velocity may be represented by ($P \sin \alpha$). The tangential effect of the spring constant is added to the friction force F to derive the sliding resistance between the slider and the disk. To maximize disk life, it is necessary to minimize slider resistance. Since friction and spring constant are already minimized by techniques outside the scope of the invention, it is desirable to minimize the angle $\alpha$ as much as possible. Hence, and with reference again to FIGS. 6A through 6H, it can be seen that smaller peaks of the sinusoidal shapes to the profiles of the runout, in the case of the shimmed profiles, will produce smaller angles. Thus, it is evident that it is desirable to maintain as small runout displacement as possible but maintain the reasonably sinusoidal shape to the profile.

Figure 4B:
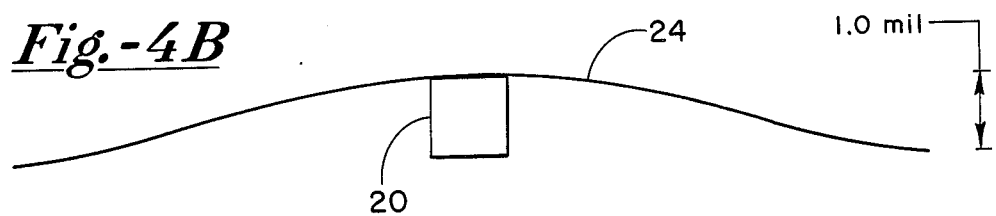

As shown in FIG. 7, only two points of maximum velocity occur over the circumference of the disk shimmed to a sinusoidal shape according to the present invention. If the profile were erratic, as in FIG. 4 or FIGS. 6E-H, the number of points which have maximum velocity will be greater. For example, FIG. 4 shows at least eight points of maximum velocity due to the shape of the profile, and perhaps more due to roughness of the profile. Hence, reductions of the number of points of maximum velocity to two maximizes disk and head life.

For purposes of applying the invention to other rigid disks, it would be necessary to test several disks of the class under test in the manner herein described to achieve the profile curve 32 illustrated in FIG. 5. The thickness of the optimal shim is determined from the portion 36 of the curve 32 in FIG. 5. A sized shim having the determined thickness is employed in the apparatus illustrated in FIG. 2.

The present invention thus provides an effective technique for dramatically increasing the life of a rigid magnetic disk. The invention is simple and has proven effective.

This invention is not to be limited by the embodiment shown in the drawings and described in the description, which is given by way of example and not of limitation, but only in accordance with the scope of the appended claims.

What is claimed is:

1. In a magnetic disk drive having a drive spindle and a disk support supporting a rigid magnetic disk and a clamp pressing said magnetic disk against said disk support, the improvement comprising a sized shim sandwiched between said magnetic disk and said disk support adjacent said disk spindle at a single location about a segment of the circumference of said disk spindle, said sized shim having a thickness sized as to form a substantially smooth sinusoidal circumferential profile to said magnetic disk.

2. Apparatus according to claim 1 wherein said sized shim creates as small a maximum slope as possible to said profile.

* * * * *